May 19, 1931.  J. E. LEE  1,806,475
MACHINE FOR TRIMMING THE CAPSULES OR SEALING COVERS
OF BOTTLES, JARS, AND LIKE CONTAINERS
Filed Nov. 10, 1928  4 Sheets-Sheet 2

INVENTOR:
John Edward Lee
BY: Ruege, Boyer & Bakelar
ATTORNEYS

May 19, 1931. J. E. LEE 1,806,475
MACHINE FOR TRIMMING THE CAPSULES OR SEALING COVERS
OF BOTTLES, JARS, AND LIKE CONTAINERS
Filed Nov. 10, 1928 4 Sheets-Sheet 3

INVENTOR:
John Edward Lee
BY: Reese, Boyce & Bakelaw
ATTORNEYS

May 19, 1931.  J. E. LEE  1,806,475
MACHINE FOR TRIMMING THE CAPSULES OR SEALING COVERS
OF BOTTLES, JARS, AND LIKE CONTAINERS
Filed Nov. 10, 1928  4 Sheets-Sheet 4
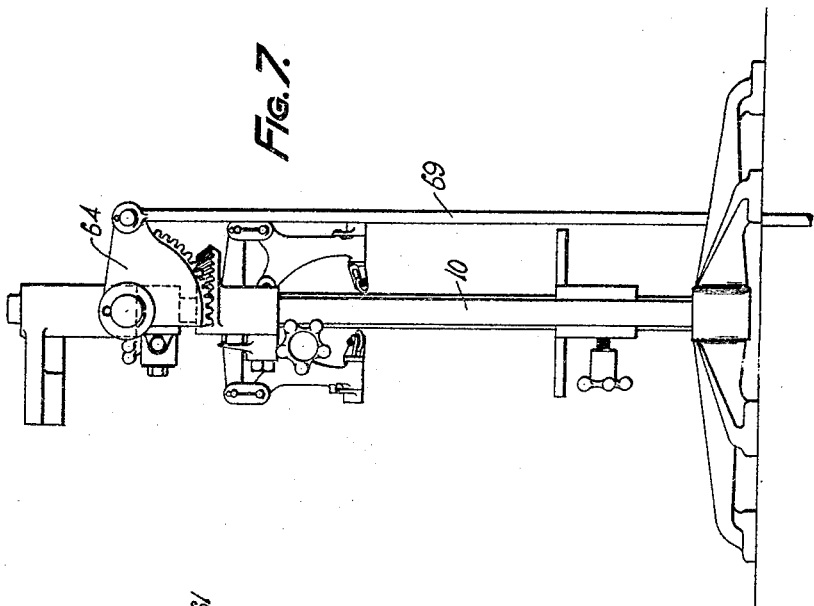
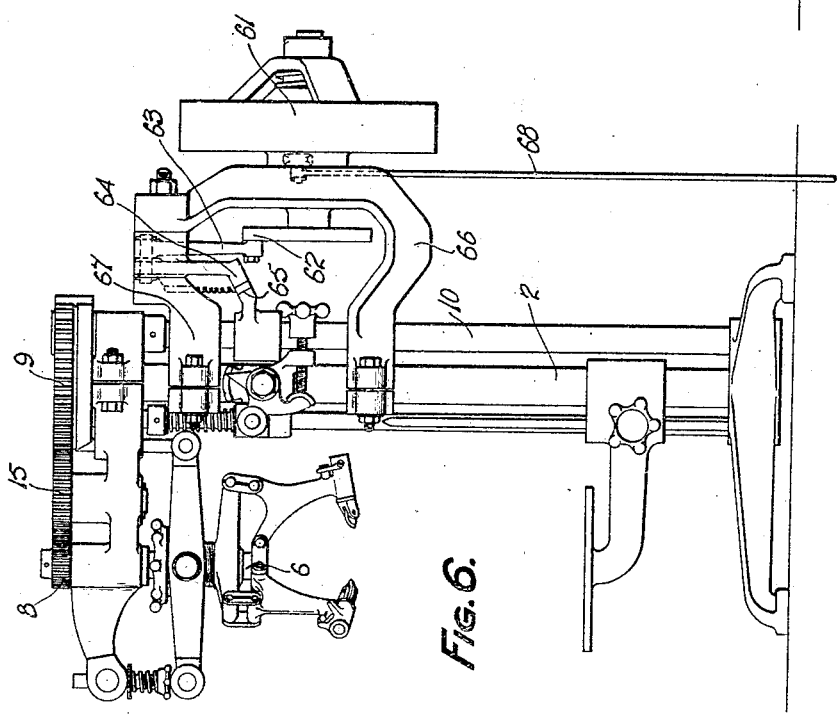
INVENTOR:
JOHN EDWARD LEE
BY Ruege, Boyce + Bachelar
ATTORNEYS.

Patented May 19, 1931

1,806,475

UNITED STATES PATENT OFFICE

JOHN EDWARD LEE, OF LEICESTER, ENGLAND, ASSIGNOR OF TWO-THIRDS TO ALFRED FOSTER CHOLERTON AND HORACE CHARLES SYDNEY TYLER, BOTH OF LEICESTER, ENGLAND

MACHINE FOR TRIMMING THE CAPSULES OR SEALING COVERS OF BOTTLES, JARS, AND LIKE CONTAINERS

Application filed November 10, 1928, Serial No. 318,349, and in Great Britain March 24, 1928.

This invention has reference to a machine for trimming off the waste material from capsules or sealing covers of bottles, jars and like containers, and has for its object the provision of a machine whereby this operation may be performed easily and quickly.

It is common practice to apply to bottles and like containers a capping or sealing cover which covers the cork or stopper and extends down the neck of the receptacle for a certain distance, said cover fitting closely and completely surrounding the neck. Certain kinds of these covers are applied wet and upon drying shrink and thereby fit tightly over the cork and about the neck.

It is desirable that the edge of these capping or sealing covers, that is the terminal portion surrounding the neck of the receptacle, should be level in order to present a neat and finished appearance. In some cases, and especially those where the capping is shrunk on in the manner above mentioned, it is necessary to trim off the surplus material in order to produce a level terminal edge. Heretofore this operation, so far as I am aware, has been carried out by hand, the operator using a knife and running it round the neck to make a circumferential cut after which the ring of surplus material thus severed has been broken or cut through and removed.

The present invention comprises a machine for performing this trimming operation.

The machine is provided with cutting means adapted to make a circumferential cut through the capping about the neck of the receptacle for the purpose of forming a level edge or termination on the said capping.

The means for making the circumferential cut just referred to constitute one feature of the invention. These means may operate with a yielding cutting pressure. Another feature of the invention is the provision of means for removing the waste marginal portion of the capping. Conveniently this waste portion is removed by the means which form the circumferential cut such removal being effected by cutting the marginal portion in a transverse direction so that instead of remaining in the form of a ring about the neck of the receptacle it will be able to fall away in one, two or more pieces.

I find that the trimming operation can be effectively carried out by a machine embodying a cutting device which commences cutting at the end of the capping and just makes one or more cuts spirally along the capping for a predetermined or desired distance and then forms a circumferential cut. The effect of this method of cutting is to first cut through that portion of the capping which is to be removed and then sever it from the remainder in such a manner as to leave a level edge on the latter. In this way the surplus material is trimmed off so that it can fall away.

The circumferential cut may be formed by rotation of the receptacle in relation to a stationary cutter or cutters, or by the cutter or cutters revolving about the neck. Or the cutter or cutters and neck may revolve in opposite directions. Preferably however, the bottle or receptacle does not rotate and the cutting is a cutting device revolving about the neck of the receptacle.

It is also a feature of the invention that for the purpose of cutting through the surplus material which is to be removed i. e. cutting it transversely, the receptacle and cutting device may have relative movement in an axial direction. For example, the cutting device may come into operative contact with the neck just below the terminal edge of the capping and then while relative movement between the receptacle and cutting device takes place in a rotary direction there may also be relative movement in an axial direction such as to cause the cutting device to operate spirally along the capping for a distance from the said terminal edge in the direction of the top of the receptacle. By controlling these movements so that the relative rotary motion continues after the relative axial movement ceases, the requisite circumferential cut is formed to sever the waste portion and leave the capping level all round at the circumferential line wherein the surplus margin has been removed.

While the invention includes any suitable mechanical arrangement for enabling the machine to operate upon the principle above referred to I prefer, and find it convenient to provide the machine with a stand or support for carrying the bottles or receptacle and to move this support relatively to the cutting device during operation of the latter. I may however, within the ambit of my invention, hold the bottle or receptacle stationary and arrange the cutting device so that it will move along the neck when operating. Or I may make the machine with a cutting device for operating rotatively about the neck of the receptacle while the latter is held by hand say against a guide, which guide, or the cutting device may be caused to move so that the action for cutting through the surplus material is brought about.

According to a convenient example of the invention the machine comprises a series of cutters adapted to close upon and rotate about the neck of the receptacle to cut the capping circumferentially while the receptacle is supported by a table or platform which is moved during the first part of the operation of the cutters and then remains stationary while the cutters continue their cutting action about the neck.

The opening and closing of the series of cutters may be effected by suitable means operating in conjunction with the means which impart rotation to the cutting device or independently thereof.

To enable the invention to be clearly understood, I will now describe a concrete form of machine by way of illustration, such machine being shown in the accompanying drawings to which reference is hereinafter made.

In the drawings,

Figure 6 is a side elevation of the machine constructed for operation by power, and Figure 7 is an end elevation of the machine adapted for operation by a treadle.

Figure 1:
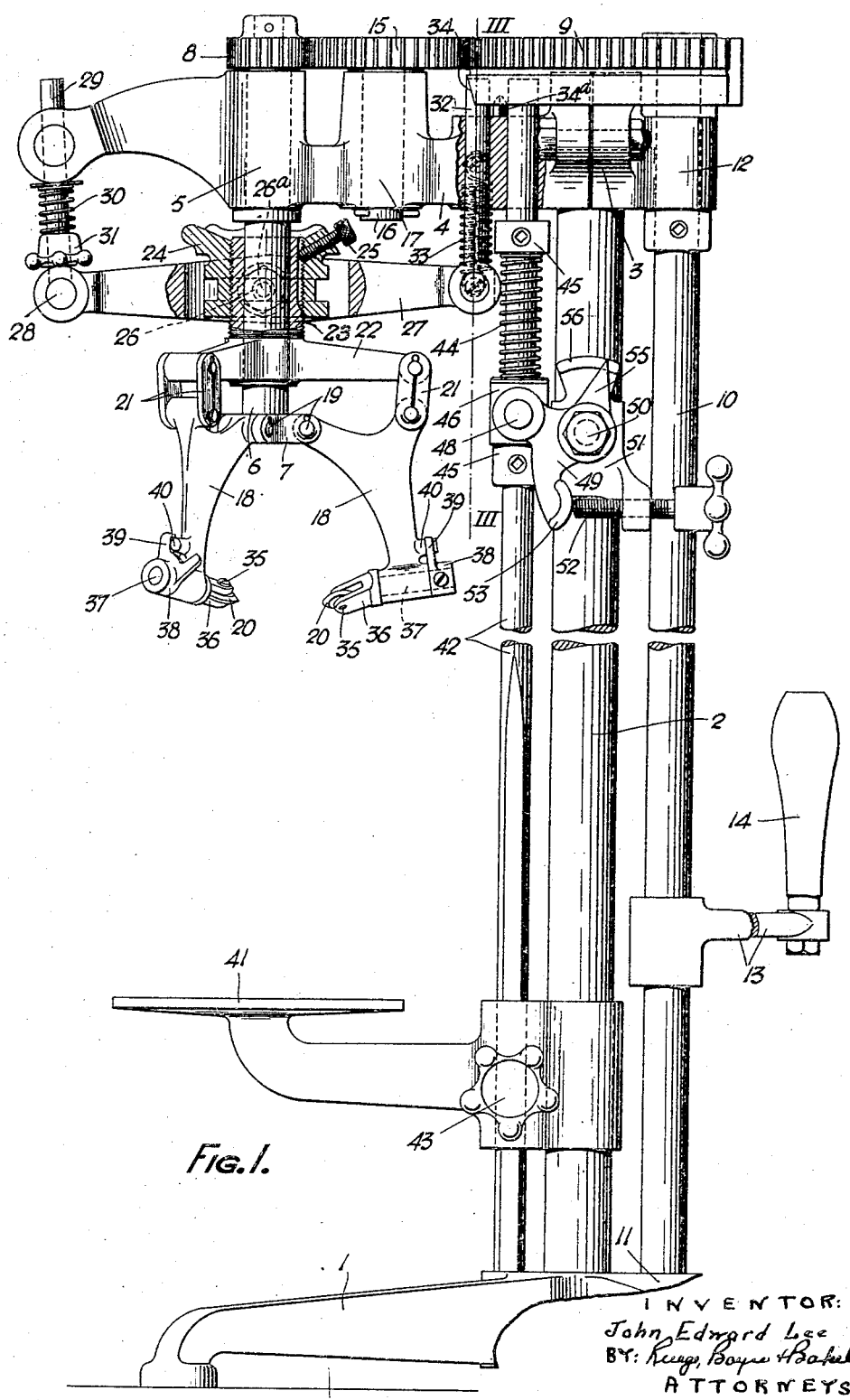
Figure 1 is a side elevation partly in section.
Figure 2:
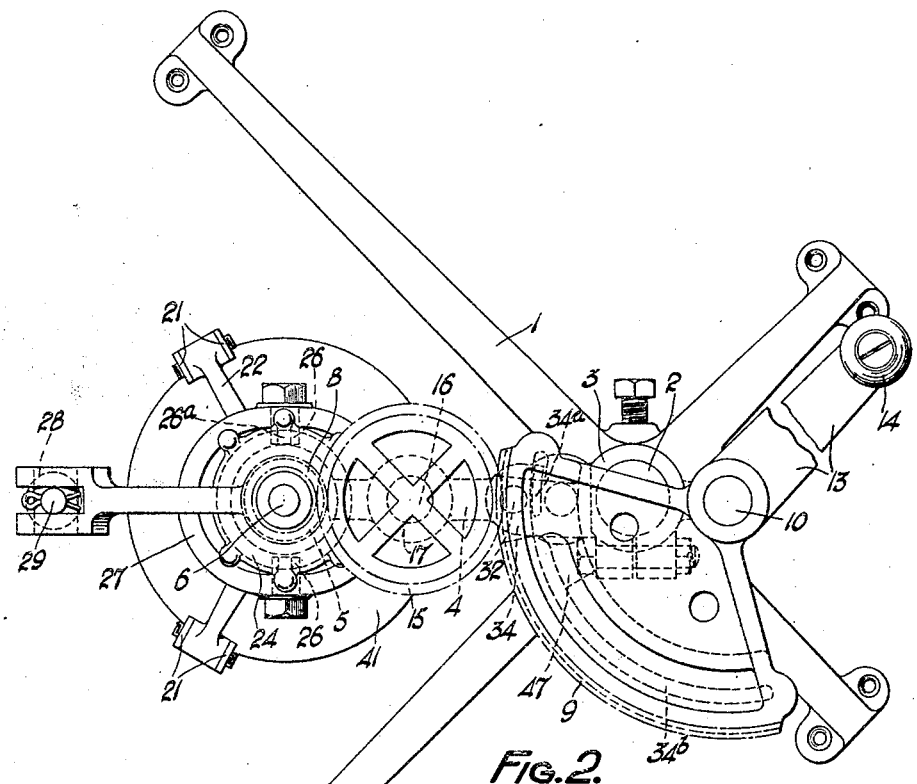
Figure 2 is a plan of the machine.
Figure 3:
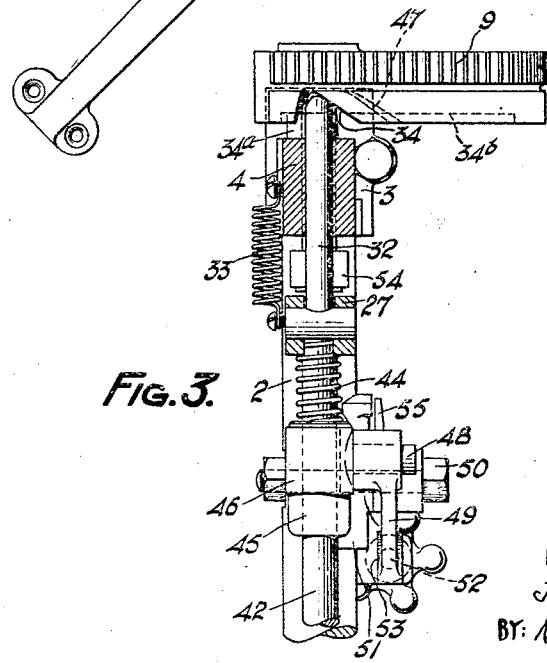
Figure 3 shows a section taken on line III—III of Figure 1.

The machine illustrated comprises a suitable frame consisting of a base 1 provided with an upright 2 to the top of which is fixed, by means of a clip 3, a horizontal arm 4 having a bearing 5 in which is rotatably carried a vertical shaft 6 on the lower end of which is fastened a fulcrum block 7. The shaft 6 has upon it a pinion 8 adapted to be driven from a quadrant 9, or gear, on a vertical shaft 10 mounted in bearings 11 and 12 on the base 1 and arm 4 respectively. This quadrant shaft has fixed thereon a lever 13 provided with a handle 14 by which it may be oscillated to impart rotation to the cutter shaft, the drive being imparted from the quadrant 9 to the pinion 8 through an idler gear 15, fast on a spindle 16 rotatable in a bearing 17 on the arm 4.

The fulcrum block 7 on the cutter shaft 6 has three carrier levers 18, pivoted at 19 thereon, which extend both downwards and radially outwards from the fulcrum block. At the lower end each carrier lever is furnished with a circular rotary cutter 20, and at its outer extremity each carrier lever is connected by pivoted links 21 to one arm of a three-armed spider 22 slidable up and down on the cutter shaft 6. The up and down movement of the spider 22 on the cutter shaft operates the carrier levers 18 by the connecting links 21 and causes them to move pivotally on the fulcrum block 7 so that the cutters 20 move respectively outwards and inwards in a radial direction, i. e. relatively to the centre about which they revolve as a series.

Figures 4, 5:
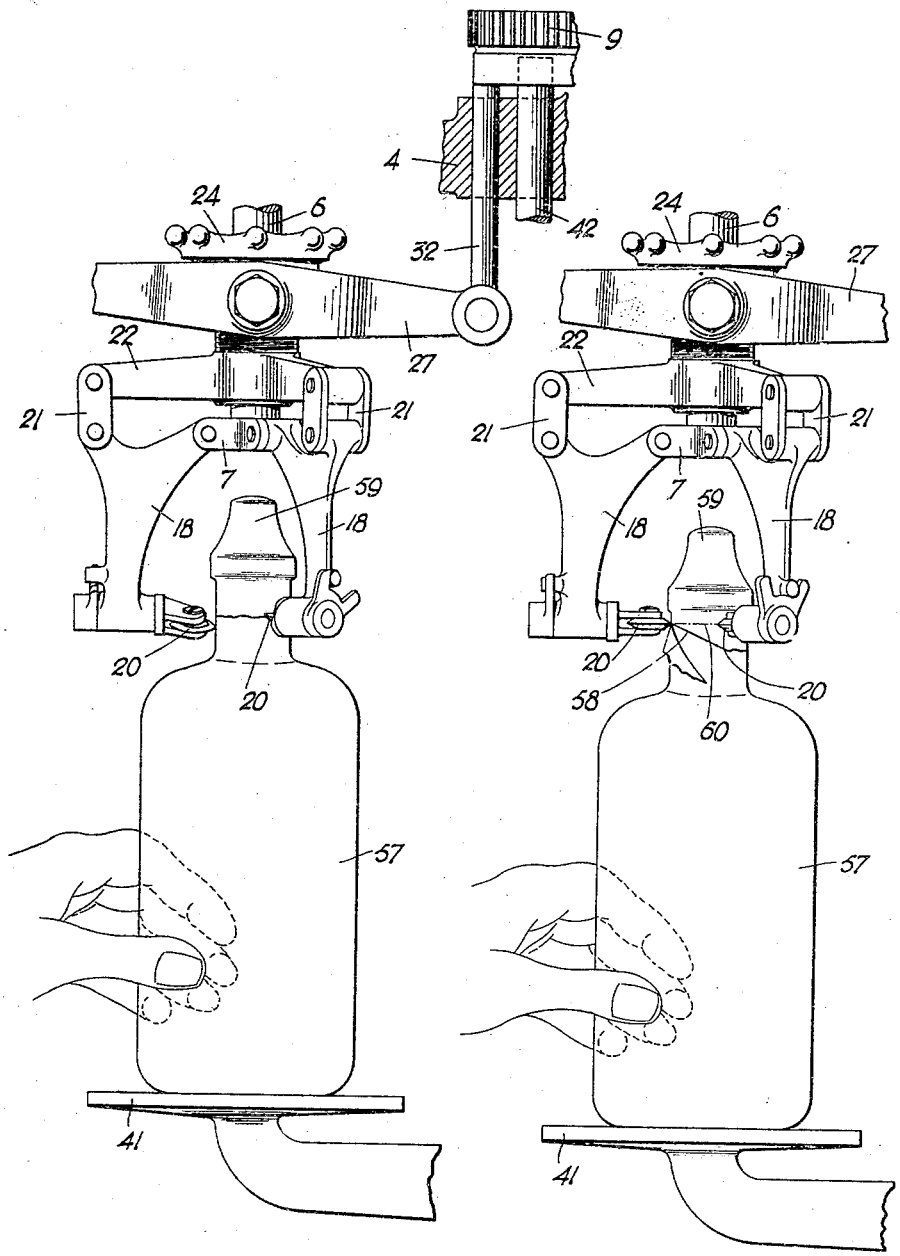
Figures 4 and 5 illustrate the operation of the machine.

The spider 22 has a screw threaded boss 23 upon which is mounted a circumferentially grooved collar or nut 24 adapted to be secured by a locking screw 25 or equivalent means. This collar or nut is engaged by rollers 26 or pins 26a in a lever 27 which, at one end, is mounted to turn on a fulcrum 28 combined with which is a plunger 29 controlled by a spring 30 providing for yield if necessary. A nut 31 is provided on the plunger for regulating the pressure exerted by the spring. At its opposite end, the lever 27 is pivotally attached to a pin 32 which slides vertically through the arm 4 and is controlled by a spring 33, the effect of which is to normally hold the spider 22 raised so that the series of cutters 20 is open. The slidable pin 32 is adapted to be acted upon by a cam 34 on the underside of the quadrant 9 when the latter is turned to rotate the cutter shaft 6, the arrangement being such that when the slidable pin is depressed by the cam 34 as represented in Figure 4, the lever 27 imparts downward movement to the spider 22 which thereby closes the series of cutters so that the latter come into operative contact with the neck of the receptacle as will be observed by comparing Figures 1 and 4. The closing movement of the cutters is limited by the neck and after this movement has taken place any further movement imparted to the lever 27 by the pin and cam causes the lever fulcrum 28 to yield against its controlling spring 30 which consequently enables the cutters to act with a yielding cutting pressure.

This arrangement provides, and it is a feature of this invention, that the cutters are yieldingly controlled during their cutting action so that not only can they adjust their position on closing to suit the size of neck to be operated upon but they can also yield and accommodate themselves to any irregularities during action. The regulation of the spring 30 controlling the fulcrum of the lever 27 controls the cutting pressure. The closing action of the cutters may be regulated to suit necks of different diameter by adjusting the grooved collar or nut 24 on the screwed boss 23 of the spider. This adjustment alters the normal height of the spider and consequently the extent to which the cutters close.

When the cam on the quadrant releases the slidable pin, upon the reverse stroke of the quadrant 9 the lever 17 is returned to normal position under spring influence and thereby raises the spider to open the cutters. The operative and reverse strokes of the quadrant 9 are limited to the co-operation of a stop 34a on the arm 4 with a slot or groove 34b of the required length in the quadrant. The cutters may be adjustable to any angle on the carriers. Alternatively they may be capable of adjustment automatically by a castor action. To this end each cutter is conveniently mounted on a pin 35 in a bearing 36 at one end of a spindle 37 rotatable in the lower end of the corresponding carrier lever 18. The spindle 37 is furnished at the other end with a collar 38 having a bifurcation 39 for engagement with a stop 40 on the lever to limit rotation of the spindle. When cutting spirally the cutter is angularly disposed as shown in Figure 4, but when making the circumferential cut said cutter is horizontally disposed as shown in Figure 5. The bifurcation 39 and stop 40 thus serve to determine the disposition of the cutter during the cutting action.

For supporting the bottle or other receptacle there is provided a table 41 adjustable up and down upon a vertical slide rod 42 for taking receptacles of different height. This table may be fastened in any desired position for use on the slide rod by a screw 43, or other suitable means. The rod 42 is slidable in the arm 4 and base 1 at its upper and lower ends respectively, and is normally held raised by a spring 44, the extent of its upward movement being determined by an adjustable stop, constituted by a collar 45 acting on another collar 46 hereinafter referred to. The downward movement of the table is imparted by a cam 47 on the underside of the quadrant acting upon the upper end of the slide rod, which projects from the arm 4, see Figure 1. The amount of drop imparted to the table may be regulated by the adjustable stop which determines the position to which the table rises. Conveniently the collar 46 is freely mounted on the slide rod 42 and has pivotally connected thereto at 48 a lever 49, fulcrumed at 50 on a bracket 51 fixed upon the upright 2, and carrying an adjusting screw 52. This screw impinges upon the rounded end 53 of the lever and when rotated, moves the collar 46 up or down. The collar 46 acts on the collar 45 on the one hand and through the spring 44 on another fixed collar 54 on the other hand, to correspondingly shift the rod 42 in relation to the cam 47, and consequently the table 41 relatively to the cutters 20. In this way the amount of surplus material to be trimmed off can be varied according to requirements. The lever 49 is provided with a pointer 55 for co-operation with fixed indications 56 on the bracket 51 to which the pointer may be set according as to whether it is desired to trim off a narrow or wide strip from the capping.

Referring to Figures 4 and 5, after the machine has been set to suit the height of the receptacle and the diameter of the neck all that is necessary in operating the machine is to place the receptacle, such for example as a bottle 57, on the table and then actuate the quadrant, the effect of the latter being to impart rotation to the cutters 20; close the latter into contact with the neck as represented in Figure 4; lower the table (see Figure 5) so that the cutters make a spiral cut 58 in the capping 59 upwards from the lower ends; and then continue rotation of the cutters while the table, after dropping, remains stationary, so that the cutters trim the capping 59 circumferentially as represented by the dot and dash line 60, thereby leaving the capping with a level terminal edge.

Upon reversal of the movement of the quadrant, the table is allowed to rise and the cutters open so that the receptacle can be removed. During rising movement of the table the cutters rotate in contact with the neck and, as the latter rises, sweep off the pieces of the severed capping material if these have a tendency to cling to the neck.

It is advantageous to use three cutters since these engage with the neck at different points and hold it central during the cutting operation. In their closing action they also serve to position the neck and in action they serve as supports thereby providing for a well balanced operation. I may however, if desired, provide a greater or less number of cutters.

It is also within the scope of the invention to construct the machine for operation by treadle instead of hand or I may provide for driving by power in either of which cases the operator would have both hands free, thereby providing the advantage that the receptacles could be more readily placed in position and removed from the machine. When power driven the machine may be appropriately modified in construction and operated by a single cycle clutch or similar arrangement controlled by the operator.

In the illustrative example shown in Figure 6, the shaft 10 is actuated by a single cycle clutch 61 of any suitable form, a disc crank 62, connecting rod 63, and toothed segments 64, 65. The clutch and disc crank are carried by a bracket 66, and the segment 64 is carried by a bracket 67, both of these brackets being clipped on the upright 2. A treadle actuated rod 68 is provided for putting the clutch 61 into operation.

Figure 7 shows by way of example, one way of operating the shaft 10 solely by means of a treadle. In this arrangement the bracket 66 (Figure 6) and the associated clutch mechanism are dispensed with and the treadle actuated rod 69 is attached to the segment 64.

In each arrangement the cutter spindle 6 is driven from the shaft 10 by gearing 8, 9 and 15 as previously described herein.

The machine may be constructed for dealing with single bottles or receptacles or it may be made to trim the cappings of two or more at a time.

What I claim then is:—

1. A machine for trimming a capsule on a bottle, jar or like receptacle, which includes a cutting device adapted to make a circumferential cut through the capsule about the neck of the receptacle, a support for the receptacle, means for effecting relative rotation between the cutting device and the receptacle, and means for effecting relative movement between the cutting device and the receptacle in an axial direction for cutting transversely through the surplus material which is to be removed preliminary to the circumferential cutting.

2. A machine for trimming a capsule on a bottle, jar or like receptacle, comprising a cutting device, means for imparting relative rotation between the cutting device and the receptacle, and means for bringing about relative linear movement between the cutting device and receptacle whereby the capsule is cut both circumferentially and transversely.

3. A machine for trimming a capsule on a bottle, jar or like receptacle, comprising a cutting device and a support for the receptacle capable of relative rotation and axial movement, means for imparting the rotation, and means for effecting the axial movement for cutting the capsule circumferentially and removing the surplus portion.

4. A machine for trimming a capsule on a bottle, jar or like receptacle, comprising a cutting device and a support for the receptacle capable of relative rotation and axial movement, means for imparting the rotation, means for effecting the axial movement and means for controlling said rotation and movement so that the former continues after the latter ceases, whereby the capsule is cut first spirally and then circumferentially.

5. A machine for trimming a capsule on a bottle, jar or like receptacle, which includes a cutting device adapted to open and close about the neck of the receptacle and to make a circumferential cut through the capsule, and means for effecting relative linear movement between the cutting device and receptacle for cutting transversely through the surplus material which is to be removed.

6. A machine for trimming a capsule on a bottle, jar or like receptacle, comprising a cutting device adapted to open and close about the neck of the receptacle, a support for the receptacle, said device and support being capable of relative rotation and axial movement, means for imparting the rotation, and means for effecting the axial movement for cutting through the capsule circumferentially and removing the surplus portion.

7. A machine for trimming a capsule on a bottle, jar or like receptacle, comprising a rotary cutting device, adapted to open and close about the neck of the receptacle, a support for the receptacle, means for rotating the cutting device, and means for moving the support axially, whereby the capsule is cut both spirally and circumferentially.

8. A machine for trimming a capsule on a bottle, jar or like receptacle, comprising a rotary cutting device adapted to open and close about the neck of the receptacle, an axially movable support for the receptacle, means for rotating the cutting device, means for moving the support axially, and means for controlling said rotary and axial movements, so that the former continues after the latter ceases, whereby the capsule is cut first spirally and then circumferentially.

9. A machine for trimming a capsule on a bottle, jar or like receptacle, comprising a cutting device adapted to open and close about the neck of the receptacle and to operate with yielding pressure, a support for the receptacle, said device and support being capable of relative rotation and axial movement, means for imparting the rotation, and means for effecting the axial movement, for cutting through the capsule circumferentially and removing the surplus portion.

10. A machine for trimming a capsule on a bottle, jar or like receptacle, comprising a cutting device adapted to open and close about the neck of the receptacle and to operate with yielding pressure, a support for the receptacle, said device and support being capable of relative rotation and axial movement, means for imparting the rotation, means for effecting the axial movement, and means for controlling said rotation and axial movement so that the former continues after the latter ceases, whereby the capsule is cut first spirally and then circumferentially.

11. A machine for trimming a capsule on a bottle, jar or like receptacle, comprising a series of cutters arranged for radial in and out movement about the neck of the receptacle, means for imparting such movement, a support for the receptacle, and means for imparting relative rotary and axial movements between the cutters and the support, whereby the capsule is cut both spirally and circumferentially.

12. A machine for trimming a capsule on a bottle, jar or like receptacle, comprising a rotary shaft, a series of cutters pivotally mounted on said shaft for radial opening and closing movement about the neck of the receptacle, means for opening and closing the cutters, means for rotating the shaft, an axially movable support for the receptacle and means for moving the support, whereby the capsule is cut both spirally and circumferentially.

13. A machine for trimming a capsule on a bottle, jar or like receptacle, comprising a rotary shaft, a series of cutters pivotally mounted on said shaft for radial opening and closing movement about the neck of the receptacle, a member slidable on the shaft and connected with the cutters, means for moving said slidable member for opening and closing the cutters, means for rotating the shaft, an axially movable support for the receptacle, and means for moving the support whereby the capsule is cut both spirally and circumferentially.

14. A machine for trimming a capsule on a bottle, jar or like receptacle, comprising a rotary shaft, a series of cutters pivotally mounted on said shaft for radial opening and closing movement about the neck of the receptacle, a member slidable on the shaft and connected with the cutters, a lever for moving said member to open and close the cutters, driving gear for the cutter shaft, an axially movable support for the receptacle, and cams associated with the driving gear for respectively actuating the lever and moving the support axially, whereby the capsule is cut both spirally and circumferentially.

15. A machine for trimming a capsule on a bottle, jar or like receptacle, comprising a rotary shaft, a series of cutters pivotally mounted on said shaft for radial opening and closing movement about the neck of the receptacle, a member slidable on the shaft and connected with the cutters, a lever for moving said member to open and close the cutters, said lever being mounted upon a yieldable fulcrum to enable the cutters to yield, if necessary, in contacting with the neck of the receptacle, means for actuating the lever, means for rotating the cutter shaft, an axially movable support for the receptacle, and means for moving the support axially, whereby the capsule is cut both spirally and circumferentially.

16. A machine for trimming a capsule on a bottle, jar or like receptacle, comprising a rotary shaft, a series of cutters pivotally mounted on said shaft for radial opening and closing movement about the neck of the receptacle, a member slidable on the shaft and connected with the cutters, a lever mounted on a spring controlled fulcrum for moving said member to open and close the cutters and enable same to yield, if necessary, in contacting with the neck of the receptacle, gearing for rotating the cutter shaft, means for actuating the gearing, an axially movable support for the receptacle, and cams combined with the aforesaid gearing for respectively actuating the lever and moving the support away from the cutters, the arrangement being that the cutters are caused to commence cutting at the terminal edge of the capsule to cut the latter spirally, and then while the support remains stationary, to continue rotating to cut the capsule circumferentially.

In testimony whereof I have signed my name to this specification.

JOHN EDWARD LEE.